United States Patent Office 2,768,648
Patented Oct. 30, 1956

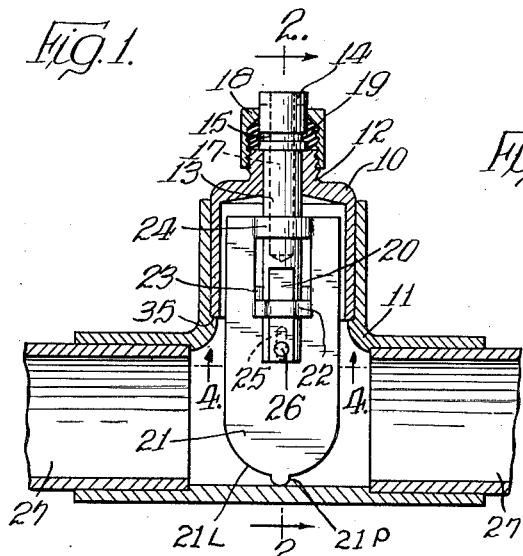

2,768,648

BALANCING VALVE AND ADAPTER UNIT FOR THE SAME

William J. Woolley, Chicago, Ill., assignor to Maid-O'-Mist, Inc., a corporation of Illinois Application October 16, 1952, Serial No. 315,010

2 Claims. (Cl. 138—46)

This invention relates to balancing valves and particularly to valves of this type with valve housings substantially consisting of standard type fittings.

The balancing and regulation of flows of water in hot water heating systems, as is well known, is necessary since the heating capacity or output of the radiator, convector, panel, or similar heating devices through which the hot water flows, is related to the rate of flow of the water. Also to be considered is the fact that the temperature of the water entering all heating devices in a system is not the same, and that the temperature of the hot water generally is warmest at those heating devices positioned closest to the boiler whereat the water is warmed. Since the water does experience temperature drops during its distribution, compensation and balance therefore can be achieved best by regulating the rate of hot water flow through each heating device in the heating system. Normally, in those heaters closest to the source of hot water supply the rate of flow is slowest, since the water inlet temperature is highest. Conversely, at those heaters farthest from the boiler, generally the rate of flow therethrough is increased to compensate for the lower inlet temperatures. It follows, of course, that for any given heating device, asuming that the water inlet temperature remains the same, the heating output increases as the rate of flow increases. Similarly, regulation of hot water flow in return mains and branches is necessary for much the same reasons.

To achieve proper heating balance it is common to provide a valve for each heating device and branch and return main to control the water rate of flow therethrough. These valves, further, generally are adjustable while the hot water system is filled and the water is under pressure to enable proper balance to be achieved under actual operating conditions.

Accordingly, one application of the new valve is the balancing of flows of water in a hot water heating system as used mainly for the heating of rooms, houses and other premises. In such systems hot water circulates under pressures which are generally regarded as being low or medium, and the piping and fittings of the system are designed and constructed accordingly.

Low or medium pressure pipe fittings suitable for such systems are mass-produced. They are therefore available at relatively low prices. Due to the standardization that goes with mass production they are readily replaceable in case of breakage or in the event that duplication is necessary. Of course each kind or class of fittings, for any particular range of pressures, is made just strong enough for the use contemplated, with such tolerances and safety features as are required by prevailing engineering standards. Therefore the dimensions of such fittings cannot be arbitrarily changed; for instance it is unsafe to incorporate drill holes, saw cuts, grooves or the like either in the inside or outside surfaces of such fittings. Each fitting serves not only to provide a clear space for the flow of water or other fluid but also to withstand definite stresses due to the weight of connected piping and water therein, vibrations, thermal contraction and expansion and the like.

On the other hand it is desirable to adapt such fittings for use as valve housings, at such points of a fluid system where valves and particularly balancing valves are required. Of course it is possible, and it was generally necessary in the past to use special valves comprising valve housings and movable parts therein which were adapted to perform the balancing functions required and also to withstand the hydraulic pressures and other loads prevailing in the system. However such special valves can never be mass-produced in such numbers as the much more numerous fittings for the system. As a result their housings are inherently more expensive than the corresponding fittings. In many cases they are also less efficient because they must be produced by casting operations or the like which may be less suitable particularly for light weight units than are the drop forging, drawing and other metal working operations employed in the mass production of fittings.

My invention provides a balancing valve wherein the valve housing substantially consists of a standard pipe fitting, used without structural change. More particularly a standard T-fitting is used, which may be either of the so-called sweat jointed or threaded or other types. Since a balancing valve of the present type need not be tight closing in any position I found it basically simple to incorporate a suitable movable element in the fitting. Some little circulation takes place around the movable valve part in all positions of such a valve, in order to allow drainage of the heating system and for other purposes. No special difficulties arose from this problem. However I found it necessary to guard against bothersome vibration of valve parts and against other undesirable actions. For these purposes a new and special balancing valve adapter has been designed as will be described hereinafter.

The main object of all valves of this kind is to provide inexpensive, strong, accurately adjustable, adjustment preserving and otherwise suitable structures in accordance with the functions and applications as mentioned. This object has been achieved in improved manner by the new adapter, and by the new valve comprising this adapter.

The principal elements whereby this has been achieved can be described in general as follows: A valve sleeve is inserted in the leg of a standard T-fitting. A valve stem extends through this sleeve with close fit. The outer end of this stem is provided with a packing-engaging groove and a removable and renewable packing gland fits over this outer end and groove to avoid leakage and also to avoid any rising of the stem due to inner pressure, and consequent binding of the valve. A valve plate is slidably secured to the inner end of the stem and is locked against rotation and vibration relative to the stem, while being rotatable within the fitting by means of a screwdriver slot in the outer end of the stem. Substantial longitudinal adjustment between the valve plate and the stem is provided by a slot and pin joint but binding of the valve against the inside of the fitting is prevented by forming the inner end of the valve plate so that it can contact the fitting practically only at one point.

This application is a continuation-in-part of my application, Serial No. 242,251, filed August 17, 1951, and now abandoned.

In order that my invention may be more fully disclosed reference is had to the accompanying drawing which illustrates two embodiments of the new balancing valve, showing such embodiments diagrammatically but in considerable detail. Of course it is distinctly to be understood that this illustration and the description thereof is provided only in the interests of a clear disclosure and that the scope of the present invention is defined only by the claims appended hereto.

In the drawing:

Figure 1 is a central sectional view through a valve conforming to the present invention;

Figure 2 is a sectional view taken on the line 2—2 of Figure 1;

Figure 3 is an exploded view of the valve stem and valve plate comprising a part of the present valve adapter and valve;

Figure 4 is a fragmentary sectional view taken on the line 4—4 of Figure 1;

Figure 5 is a central sectional view of a modified embodiment of this invention;

Figure 6 is a sectional view taken on the line 6—6 of Figure 5; and

Figure 7 is a fragmentary sectional view taken on the line 7—7 of Figure 5.

Referring first to Figures 1 to 4: a sleeve 10 is inserted in the leg of a sweat-type T-fitting 11. The two parts are secured together by sweating, brazing or similar operations around the annular edge formed at the end of the leg of the T-fitting. Such operation is the same as would be performed if a plain pipe were secured to said leg; accordingly no unusual stress or strain is developed.

The sleeve 10 includes a threaded collar 12 outside of and coaxial with the leg of the T-fitting 11. A valve stem 13 is journaled in this collar of the sleeve 10, the collar of course being long enough to prevent objectionable tilting or vibration of the stem, according to design principles well known to the art. The valve stem 13 is smoothly ground to a certain diameter, with close fit in the collar 12. It is provided with a head portion 14 of slightly larger diameter on the outside of the collar 12. An annular groove 15 is formed in the head portion 14. Further the upper end of this head portion is provided with a straight transverse slot 16 by means of which the stem 13 can be turned by a screwdriver.

The stem 13 is shown as having a thermometer well 17 coaxially formed therein, which extends well into the inner portion of the fitting 11. In other words this well is longer than the sum of the length of the head 14 and collar 12.

A packing nut 18 having flexible packing material 19 therein is adapted to fit over the head portion 14 of the valve stem and is threadedly engaged with the collar 12 of the sleeve 10. An integral portion of the packing material 19 is extruded into the groove 15 by the pressure of the nut 18.

The inner end portion of the valve stem 13, which can also be called the lower portion thereof although the position of the valve is subject to change, is shown as being bifurcated so that it consists of two parallel tabs 20, 20 having flat sides opposite one another. The outer sides of these tabs, parallel with said inner ones, are also shown as being flattened, for reasons which will appear presently.

A valve plate 21 is inserted between the flat inner sides of the bifurcated valve stem 13. This valve plate includes two struck-out bands 22 and 23 which jointly form a ring fitting over the two tabs 20. I also show a third struck-out band 24 which fits upon the solid circular portion of the valve stem 13. The bands 22 and 23 as best shown in Figure 4 conform generally to the shape of the tabs 20 thereby guiding the two parts 13, 21 in longitudinal directions parallel with the stem upon any sliding motion of the plate relative to the stem. This sliding motion is allowed within certain limits by a slot 25 formed in the valve plate 21 between the two stem tabs 20. A rivet pin 26 extends through this slot and is secured to the end portions of the tabs 20. In this manner a certain amount of longitudinal movement of the valve plate 21 up and down along the valve stem 13 is allowed while rotation between the two parts as well as vibration is prevented. For these purposes it is important that contact between the valve plate and the stem is provided at a plurality of longitudinally spaced points both inside and outside the bifurcation of the stem. Again the desirable longitudinal spacing of the contact points is facilitated by the construction wherein the leg of the T-fitting is used as a part of the valve housing. It is possible in this manner to provide a more efficient and mainly more vibration-proof valve at a lower cost, as compared with constructions used in the past.

For the purposes indicated it is particularly desirable to form the valve plate of brass and the valve stem of stainless steel, although different combinations of material can be used if required by the fluid circulating in the pipe system or by other considerations. A brass plate of the form as shown and described can be punched out in a single operation, with struck-out bands 22, 23 the inside profile of which fits over the cornered profile of the bifurcated stem with some slight pressure. Due to the resiliency of the stem tabs provided by the bifurcation upward and downward sliding can easily be achieved while looseness is safely avoided. It is even possible in this method of construction that upon original assembly the corners of the tabs cut slightly into the brass of the struck-out bands thereby forming accurate grooves for longitudinal sliding, at practically no expense.

The lower end 21–L of the valve plate, opposite the leg of the T-fitting is substantially semi-circular with a diameter slightly smaller than the inside diameter of the T-fitting. A small projection or point 21–P is formed in this rounded end of the valve plate. It will be noted that this point or projection contacts the inside of the fitting even when no hydraulic pressure is applied and when the valve is arranged in its normal position with the head 14 upright; thereby spacing the remaining portions of the rounded plate surface from the inside of the fitting in order to make sure that no binding occurs even in the event that there are irregularities in the inside surface, as is often the case. As is apparent from the drawings, the frictional engagement of projection 21–P with the fitting inner wall further serves to prevent fluttering of the valve plate as water flows thereby. The fact that some fluid passes around the valve plate even when the plate is turned to fully throttling position is an advantage rather than a detriment in balancing or butterfly valves of this kind which require no full closure or infinitesimal approach thereto but which rather are expected to allow a drainage of the system without manipulation of the valve.

The valve plate 21 as shown is slightly elongated, starting at the semi-circular end and continuing with side edges tangential upon the terminal portions of said semi-circular end. The aforementioned point or projection, the slot 25 and the struck-out bands 22, 23 and 24 are arranged symmetrically with the long axis of the elongated or obround valve plate. The portion of the plate between the uppermost struck-out band 24 and the next following band 23 is shown as being punched out of the plate; this can be done in the same operation which forms the other features of the plate. The upper end of the plate itself is shown as being substantially square cornered and extending into the sleeve 10, the inner end of which is hollow in order to accommodate this upper end of the valve plate. Excessive passage of water around the valve plate and mainly around the somewhat elongated side edges is prevented by the fact that said side edges will be rather close to the inner surfaces of the fitting and valve sleeve; the inner profile of the fitting being substantially similar with that of the plate as appears best from a comparison of Figures 2 and 3. Excessive leakage is also counteracted by the fact that normally air will accumulate in the upper part of the fitting and in the hollow part of the valve sleeve.

In cases where the valve is installed with the leg of the T pointing downward or where the hydraulic pressure is substantial it is important to avoid binding between the upper, more or less squared end of the valve plate and the inside of the hollow valve sleeve. In this region binding can manifestly not be avoided in the manner used at the opposite end. On the other hand it is expensive to utilize an accurate stop motion device, which by itself is well known to the art; particularly in view of the fact that the exact inside dimensions of T-fittings of the type shown are subject to slight change between different manufacturers, and also between the different standards used by any one manufacturer at different times. These differences, as noted above, are accommodated by the provision for longitudinal sliding, allowed by the rivet pin 26 and slot 25; and inasmuch as the differences between fitting dimensions are sometimes substantial, some appreciable length of sliding motion in slot 25 is required. On the other hand it is undesirable that such sliding should actually take place once that the valve has been installed, except to a minor extent, because major sliding would be certain to cause a binding between the top end of the plate and the sleeve, thereby tending to cause injury to the valve whenever the stem and plate are angularly readjusted. Such major longitudinal motion can be prevented by utilizing, for the initial adaptation to a given pipe fitting, both the length of the slot 25 and a certain extra length of the outer end or head of the stem, and by utilizing the packing 19 and groove 15 as a locking device for the stem. The locking obtained in this manner is flexible and slightly yieldable and there may be some minor inward and outward motion of the stem in case of changing fluid pressures; however all binding at the upper end of the valve plate can be avoided in this manner.

The manner of installing the new valve adapter is as follows, if the T-fitting 11 has previously been installed on the pipes 27 forming part of the heating system:

The installer receives the valve adapter unit consisting of the parts 10, 13, 18, 19, 21 and 26. The valve plate 21 as received is secured to the valve stem 13 by the rivet 26. Also the stem 13 is inserted through the sleeve 10, packing 19 and nut 18; the packing nut 18 being only loosely assembled in place. Thus the component parts of the valve adapter will not fall apart but they can be inspected and if necessary disassembled or replaced by a new unit with a minimum of effort and without the need for an extra valve housing. In fact the valve housing may already be in place and it is thus unnecessary to revise the piping when replacing the movable valve parts.

The installer should first remove the packing nut 18 and packing 19 and then insert the hollow sleeve 10 in the leg of the fitting; usually until it contacts the shoulder 35, preformed in the standard sweat type fitting. Next the hollow sleeve 10 is sweated or brazed in place in the manner mentioned above. Since this operation is performed while the packing is removed there is no danger that the packing will be burned or damaged.

The packing nut 18 is then screwed down onto the threaded collar 12 but for the moment only by a short distance, while the stem 13, by a screwdriver inserted in the slot 16 is held down with the lower shoulder of the head 14 contacting the top of the collar 12. In this manner the valve plate 21 is given a preliminary setting. Since the slot 16 in the head portion 14 is in fixed alignment with the valve plate 21 the installer knows the position of said plate 21 within the fitting 11.

The definite setting of the valve plate 21 is best determined upon a test conducted with a thermometer inserted in the thermometer well 17. Since typically a number of balancing valves are installed in a hot water system it is necessary that each be set accurately to balance the flow of water to the various parts of the system. Usually this is done by manually sealing the various valves and estimating their temperature but I prefer to use the thermometer well 17 whereby a more accurate reading can be obtained and accordingly the entire hot water system can be balanced more efficiently. When this has been done, or generally when the installer is ready to place the system in operative condition the packing nut 18 should be tightened down to such extent as is provided for the packing 19 in question, while the valve stem 13 is held in position by means of a screwdriver inserted in the slot 16. The packing 19 is thus caused to flow into the groove 15, thereby providing a lock against the valve stem 13 moving outwardly in objectionable manner due to water pressure within the system. Binding of the valve is thus avoided even in the event that a fitting 11 must be used wherein the shoulder 35 is arranged at a particularly low elevation and wherein accordingly the sliding movement allowed by the slot 25 brings the valve plate, when rising, to the immediate vicinity of the top surface in the valve sleeve.

In actual use of the hot water system flow of water takes place in different directions, past the balancing valve. When such flows tend to turn or oscillate the valve, shifting and vibration are safely prevented by the described locking features between the plate and the stem and between the stem and the packing. It will be understood that the tendency for the valve to shift or change its adjustment is minor due to the symmetrical and balanced design thereof, and such tendency arises practically only from irregularities of the inside surfaces of the valve housing which cause a slightly unbalanced condition mainly when the degree of throttling is high. These tendencies as well as the tendency of the stem to rattle or vibrate must be counteracted by the pressure of the packing, and it must still remain possible to readjust the valve should this become necessary because of changes or difficulties in operation. The present valve adapter achieves these holding and readjusting functions with means of extreme simplicity and adaptability as described.

Some slight change is required in part but not all of the elements described herein in the event that a pipe fitting of different type is used, for instance if a screw fitting is used instead of the drawn tubing described up to this point. An interiorly threaded pipe fitting 28 is shown in Figures 5, 6 and 7 and it will be seen that here the leg of the T has an interior pipe thread, engaged by an exteriorly threaded sleeve 29. The valve stem 13, packing nut 18 and packing 19 may be identical with those of the first embodiment. A somewhat shorter valve plate 30 is usually required, the length of the leg of the fitting being shorter than in the case of a drawn tube fitting. For this reason the modified valve plate 30 is shown as fitted between bifurcated tabs 20 and held by only two stuck-out bands 32, 33 instead of the greater number of holder bands shown in Figure 3.

In the assembly of this modified fitting itself is secured to the piping 34 in known manner and the valve adapter is then installed in the manner of a pipe plug. For this purpose the sleeve member 29 may have a squared portion between the pipe threaded portion at one end and the straight threaded packing portion at the other end.

It will be understood by persons skilled in this art, upon a study of this disclosure, that a number of further changes can be applied. This is a continuation-in-part of my application Serial No. 242,251 filed August 17, 1951.

I claim:

1. A balancing valve for use with a standard T-fitting including aligned branch runs and a leg run connected thereto, comprising: a valve stem; a sleeve having a close sliding fit about the upper portion of said stem; a generally flat valve plate terminally secured to and slightly elongated in the direction of the stem, the end of the plate remote from said stem being semicircular and the remainder of the plate being substantially rectangular and extending from said semicircular end; a small axial projection extending symmetrically with the sides of the plate from the semicircular end; a packing nut threadably connected with the other end of the sleeve and extending along a portion of said stem, and packing between said stem and said packing nut, whereby insertion of the sleeve into the leg run positions the valve plate between the branch runs to control water flow therebetween, engagement of said projection with the fitting inner wall opposite said leg run maintains said semicircular end spaced slightly from said inner wall to allow the plate to rotate regardless of dimensional irregularities of said inner wall, and movement of the valve stem along the leg run is substantially restrained by tightening the packing nut.

2. A balancing valve assembly comprising a T-fitting having aligned branch runs and a leg run connected thereto; a sleeve, one end of which is snugly insertable into the fitting leg run; a valve stem having a close sliding fit within said sleeve and an annular groove adjacent its outer end; a generally flat valve plate including an innermost portion of semicircular shape, positionable between said branch runs and slightly smaller in diameter than the inside diameter thereof, and a substantially rectangular portion extending from said semicircular portion into said leg run substantially to said sleeve; means whereby said plate is mounted to the other end of said stem for close sliding movement relative thereto; means whereby the relative movement between said plate and said stem is limited so as to prevent said plate from binding against said sleeve; a small axial projection extending symmetrically with the sides of the plate and having sufficient length to touch the inner fitting wall opposite said leg run; and a packing nut threadably connected with the other end of the sleeve and extending along a portion of said stem, whereby insertion of the sleeve into the leg run positions the projection against said inner wall to space the plate slightly therefrom, relative movement between said plate and said stem automatically vertically positions said plate, and tightening of said packing nut locks packing in said groove to restrain movement of said valve stem along said leg run.

References Cited in the file of this patent

UNITED STATES PATENTS

| | | |
|---|---|---|
| 772,007 | Theis | Oct. 11, 1904 |
| 850,622 | Clark | Apr. 16, 1907 |
| 888,064 | Chambers | May 19, 1908 |
| 1,490,039 | Spencer | Apr. 8, 1924 |
| 1,716,277 | Messmer | June 4, 1929 |
| 1,808,092 | Wimmer | June 2, 1931 |
| 2,147,124 | Litle | Feb. 14, 1939 |
| 2,608,203 | Butler | Aug. 26, 1952 |

FOREIGN PATENTS

| | | |
|---|---|---|
| 7,256 | Great Britain | 1899 |
| 796,613 | France | of 1936 |